United States Patent
Litzenberg et al.

(10) Patent No.: US 10,112,337 B2
(45) Date of Patent: Oct. 30, 2018

(54) VOLUME CONTROLLED BLOWING-AIR FEED

(71) Applicant: KHS Corpoplast GmbH, Hamburg (DE)

(72) Inventors: Michael Litzenberg, Geesthacht (DE); Karl-Heinz Balkau, Oststeinbek (DE); Dieter Klatt, Hamburg (DE); Michael Linke, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 0 days.

(21) Appl. No.: 14/808,686

(22) Filed: Jul. 24, 2015

(65) Prior Publication Data

US 2016/0023396 A1   Jan. 28, 2016

(30) Foreign Application Priority Data

Jul. 25, 2014   (DE) .................. 10 2014 010 861

(51) Int. Cl.
*B29C 49/18*   (2006.01)
*B29C 49/78*   (2006.01)
(Continued)

(52) U.S. Cl.
CPC .............. *B29C 49/18* (2013.01); *B29C 49/78* (2013.01); *B29C 49/783* (2013.01); *B29C 49/06* (2013.01); *B29C 49/36* (2013.01); *B29C 49/4289* (2013.01); *B29K 2101/12* (2013.01); *B29L 2031/712* (2013.01); *B29L 2031/7158* (2013.01)

(58) Field of Classification Search
None
See application file for complete search history.

(56) References Cited

U.S. PATENT DOCUMENTS

| 4,214,860 A | 7/1980 | Kleimenhagen et al. |
| 5,648,026 A | 7/1997 | Weiss |

(Continued)

FOREIGN PATENT DOCUMENTS

| DE | 102013111950 A1 | 4/2015 |
| EP | 0655313 B1 | 5/1995 |

(Continued)

*Primary Examiner* — Monica A Huson
(74) *Attorney, Agent, or Firm* — Lucas & Mercanti, LLP; Klaus P. Stoffel

(57) ABSTRACT

A method for controlling a blow-molding machine for producing a thermoplastic container, wherein a blowing gas for blow-molding the container is introduced into a thermally conditioned preform, while the preform is held in a blow mold of the blow-molding machine. The blowing gas is introduced during a preblowing phase into the preform so that the temperature-conditioned material of the preform approaches the walls of the blow mold. The blowing gas is introduced during a following finish-blowing phase into the preform so that the temperature-conditioned material of the preform is pressed into the contours of the blow mold walls. The volumetric flow rate of the blowing gas is determined at least during the preblowing phase by an adjustable flow-control valve that can be controlled by a control unit that generates a control signal for adjusting the flow-control valve. The flow-control valve is adjusted as a function of the control signal.

10 Claims, 4 Drawing Sheets

(51) Int. Cl.
  *B29L 31/00* (2006.01)
  *B29C 49/06* (2006.01)
  *B29C 49/36* (2006.01)
  *B29C 49/42* (2006.01)
  *B29K 101/12* (2006.01)

(56) References Cited

U.S. PATENT DOCUMENTS

| | | |
|---|---|---|
| 2003/0209266 A1 | 11/2003 | Dupuis |
| 2006/0012085 A1 | 1/2006 | De Bruyn et al. |
| 2006/0097417 A1* | 5/2006 | Emmer ............... B29C 49/0042 264/40.1 |
| 2006/0110483 A1 | 5/2006 | Damerow et al. |
| 2010/0201013 A1* | 8/2010 | Monin .................... B29C 49/58 264/40.3 |
| 2010/0276849 A1 | 11/2010 | Derrien et al. |
| 2013/0113143 A1* | 5/2013 | Fevre ..................... B29C 49/46 264/524 |
| 2015/0118342 A1 | 4/2015 | Finger et al. |

FOREIGN PATENT DOCUMENTS

| | | |
|---|---|---|
| EP | 0891855 B1 | 1/1999 |
| WO | 2013023789 A1 | 2/2013 |

* cited by examiner

VOLUME CONTROLLED BLOWING-AIR FEED

CROSS-REFERENCE TO RELATED APPLICATIONS

The present application claims priority of DE 10 2014 010 861.9, filed Jul. 25, 2014, the priority of this application is hereby claimed and this application is incorporated herein by reference.

BACKGROUND OF THE INVENTION

The present invention pertains to a method for controlling a blow-molding machine for the production of a container of thermoplastic material, to a control device for controlling a blow-molding machine for the production of containers of thermoplastic material, and to a blow-molding machine for the production of containers of thermoplastic material.

In methods of the type indicated above, a blowing gas or blowing air is introduced into a thermally preconditioned preform of thermoplastic material to blow-mold a container. The blow-molding process typically proceeds in two stages. In the first or "preblowing" phase, the preform is subjected to a first pressure of, for example, 10 bars, so that the temperature-conditioned material of the preform expands uniformly in a controlled manner and can come to rest against the walls of the blow mold. In the second or "finish-blowing" phase, the preexpanded preform is subjected to a second pressure of, for example, 40 bars, so that the material can conform completely to the contours of the blow mold being used.

Because the pressure of the process gases at a blow-molding machine are normally in the range of 40 bars, the blowing pressure in conventional systems is reduced during the preblowing phase to approximately 10 bars by a pressure control valve.

During the preblowing phase, the blowing gas is introduced into the preform through a flow-control valve, for example, with an open cross section of, for example, 4 $mm^2$. The setting of the flow-control valve depends on various factors such as the type of material of the container to be produced, the temperature profile with which the preform was thermally conditioned, the wall thickness of the preform, and other parameters as well. The degree to which the flow-control valve is opened is typically adjusted manually a single time and remains unchanged after that. Another manual change of the valve cross section can be necessary, however, when a flow-control valve has become dirty over the course of its service life, for example, or the blow-molding machine is to be set up for a different blow mold or a different preform.

The disadvantage with this prior art is that, first, the pressure of the blowing air for the preblowing phase must be adjusted downward, and, second, the volumetric flow rate of the blowing air is not adjustable during either the preblowing or the finish-blowing phase.

SUMMARY OF THE INVENTION

The goal of the present invention is therefore to provide a method, a control device, and a blow-molding machine which make it possible to produce containers of thermoplastic material at high throughputs and which improve the controlled introduction of blowing air into the preform.

According to the invention, a method for controlling a blow-molding machine for the production of a container of thermoplastic material is provided, wherein a blowing gas for the blow-molding if the container is introduced into a thermally conditioned preform while the preform is being held in a blow mold of the blow-molding machine. During a preblowing phase, the blowing gas is introduced into the preform in such a way that the temperature-conditioned material of the preform approaches the walls of the blow mold, and, in the following finish-blowing phase, the blowing gas is introduced into the preform in such a way that the temperature-conditioned material of the preform is forced into the contours of the walls of the blow-mold. The volumetric flow rate of the blowing gas, at least during the preblowing phase, is set by an adjustable flow-control valve. The method according to the invention is characterized in that a flow-control valve controlled by a control unit is used as the flow-control valve, a control unit generates a control signal for setting the flow-control valve, and the flow-control valve is adjusted as a function of the control signal.

In a preferred variant, it is provided that an electrically actuated flow-control valve is used as the flow-control valve.

When a flow-control valve controlled by a control unit is used, the introduction of the blowing gas or blowing air into the thermally preconditioned preform can be varied during the blow-molding phase. The introduction of the blowing gas can therefore be adapted individually to the properties of the preform which determine its expansion behavior. It should be pointed out that the expressions "blowing gas" and "blowing air" are used synonymously. A blowing gas, in particular blowing air, is provided for the blow-molding process.

In the invention it is advantageous that only a single blowing pressure must be provided for both the preblowing and the finish-blowing phases. In particular, it is possible to eliminate a pressure control valve to reduce the primary blowing pressure to 10 bars, for example, for the preblowing phase. The pressure control valves usually used to reduce the preblowing pressure are very expensive and require continuous monitoring and/or continuous maintenance by trained personnel. The use of a pressure control valve also increases the complexity of the fluid-mechanical components mounted on the blow-molding machine. When the method according to the invention and the blow-molding machine according to the invention are used, there is no longer any need for a pressure control valve.

Another essential advantage of the use of an electrically actuated flow-control valve is that the settings of the flow-control valves for all of the blow-molding stations can be controlled from the central control system. Once the operator of the blow-molding machine has determined the profile for the introduction of the blowing air into a tempered preform for the production of a certain container, he can simply enter the adjustment parameters into the central control system. There is no longer any need to set the flow-control valves individually for each blow-molding station of the blow-molding machine. The control unit preferably ensures that the flow-control valve setting, i.e., the volumetric flow rate, is the same for each blow-molding station.

The setting of a flow-control valve by way of a central control system eliminates the need for manual adjustment of each individual flow-control valve assigned to the blow-molding stations. A subsequent adaptation of the flow-control valve setting, e.g., for the preblowing phase, can be carried out easily and quickly by way of the central control system. This also makes it possible to adjust the flow-control valve for each blow-molding station individually. This can be necessary when, for example, a flow-control valve assigned to a specific blow-molding station has undergone aging or wear.

The control unit can be integrated into the process control of the blow-molding machine, for example. Alternatively, a separate control system can be provided. The control unit is preferably integrated into the process control of the fluid-mechanical system of the blow-molding machine.

To adjust the electrically actuated flow-control valve, the control unit generates a control signal. The electrical control signal can consist of individual signals separated from each other in time or a continuous signal. Depending on the flow-control valve used or on the actuation device assigned to the flow-control valve, the control signal can comprise at least some digital and/or analog electrical signals. In particular, it can be provided that the control signal is a control profile, which describes the chronological course of the flow-control valve settings, i.e., the change in those settings over the course of time.

Instead of or in addition to an electrically actuated flow-control valve, it is also possible to use a pneumatically or hydraulically actuated flow-control valve. The control unit for this purpose generates a pneumatic or hydraulic control signal as explained above, wherein the control signals in this case are transmitted over pressure lines instead of over electrical lines or in wireless fashion. In the following, an electrically controlled flow-control valve is described as also representative of pneumatically or hydraulically controlled flow-control valves. The explanations and the described advantages apply correspondingly to pneumatically or hydraulically controlled flow-control valves.

In one embodiment of the invention, the volumetric flow rate of the blowing air is controlled progressively by the use of a continuously variable flow-control valve.

When a continuously variable flow-control valve is used, the advantage of being able to make fine adjustments to the volumetric flow rate of the blowing air is obtained. In contrast to a continuously variable flow-control valve, a stepwise-adjustable flow-control valve is low in cost and of mechanically simple design. Depending on need, the method according to the invention can be implemented with either a stepwise-adjustable or a continuously variable flow-control valve.

The flow-control valve is preferably subjected on the inlet side to the gas pressure of the blowing air from the finish-blowing phase. In this embodiment in particular, therefore, it is provided that a shutoff valve assigned to the finish-blowing circuit and the flow-control valve in the preblowing circuit are both subjected to the same gas pressure. When the pressure of the blowing gas of the finish-blowing phase is used, there is no need for a pressure reducer in the preblowing circuit of a blowing station of the blow-molding machine. This is especially advantageous, because such pressure reducers are expensive, complex, and fault-prone. The down times of the blow-molding machine attributable to maintenance work on the pressure reducer are eliminated. It is therefore preferable to conduct the preblowing and the finish blowing with the same gas pressure, in particular without a pressure-reducing device in the preblowing circuit. The finish-blowing circuit comprises fluid-mechanical components for conducting blowing air for the finish-blowing of the container, and the preblowing circuit comprises fluid-mechanical components for conducting blowing air for the preblowing of the container, i.e., of the preform.

In one embodiment, it is provided that a flow-control valve position sensor detects the setting of the flow-control valve and generates a position signal, which contains information on the position of the flow-control valve, this position signal then being transmitted to the control unit.

The position information pertaining to the flow-control valve is in particular the open cross section to which the flow-control valve has been set. The transmission of the position signal to the control unit can be conducted by the flow-control valve position sensor itself or by a transmission unit connected to it.

It can also be provided that the control unit generates the control signal as a function of the position signal. As a result, the control unit can execute an automatic control algorithm, in which the control unit determines a control deviation between a control variable influencing the open cross section of the flow-control valve and the actual opening of the flow-control valve and takes this deviation into account in the automatic control circuit. This makes possible an automatic control of the flow-control valve setting which is relatively insensitive to disturbance variables. This is especially advantageous in the case of flow-control valves which change their flow-through properties as a result of aging and/or wear phenomena.

It can be provided in particular that the flow-control valve comprises an open cross section which can be adjusted within the range from 0.8 $mm^2$ to and including 20 $mm^2$.

In one embodiment of the invention, a nominal profile is stored in the control unit; this profile describes the change over time in the volumetric flow rate of the blowing air, and the control unit generates the control signal for setting the flow-control valve as a function of the nominal profile.

The nominal profile is a predetermined description of the change in the flow-control valve setting over the course of at least one time period. In particular, the nominal profile covers the time period in which the blowing air is conducted through the flow-control valve into the preform. The change over time in the volumetric flow rate through the flow-control valve is characterized by a curve which plots the flow-control valve setting versus time. The change over time in the volumetric flow rate of the blowing air through the flow-control valve is obtained from, for example, the pressure difference between the inlet and the outlet of the flow-control valve and from the opening cross section of the flow-control valve. The nominal profile therefore determines in particular the desired open cross section of the flow-control valve over time. When a flow-control valve which switches exclusively between an open position and a closed position is used, the nominal profile preferably determines the switching frequency at which the valve is switched back and forth between the open and closed positions. The nominal profile is preferably changeable.

A volumetric flow rate sensor communicating with the flow-control valve preferably generates a volumetric flow rate signal containing information on the air flow quantity, wherein the volumetric flow rate signal is transmitted to the control unit. The term "air flow quantity" is understood to mean in particular the volumetric flow rate. The information on flow quantity can be further processed in the control unit according to control and/or automatic control algorithms.

In another embodiment, a desired upper and/or lower limit value of the volumetric flow rate of the blowing gas is stored in the control unit for at least one point in time of the preblowing phase, wherein the control unit compares the volumetric flow rate signal with the limit values and the generates the control signal as a function of the difference between the volumetric flow rate signal and at least one of the limit values.

In this embodiment, it is provided that the upper and lower limit values define a corridor, within the boundaries of which the volumetric flow rate conducted through the flow-control valve is intended to stay. By comparing the volumetric flow rate signal with the limit values, it is possible to draw a direct conclusion concerning the volume conducted through the flow-control valve. For the purpose of correction, the control system can generate control signals to prevent overshooting or undershooting the corridor boundaries, i.e. to keep the measurement value of the volumetric flow rate through the flow-control valve in a certain range within the corridor. The desired limit values are preferably changeable.

A valve with a magnetically moved closing body is preferably used as the flow-control valve. Flow-control valves of this type are, for example, RRVs (Rapid Reaction Valves). What is characteristic of these valves in particular is that the valve seat is sealed by a spherical closing body. For the magnetic actuation of the valve, the closing body is magnetizable, and the valve housing is surrounded by a magnetic coil. The functional principle of such valves is based on the fact that, at the level of the closing body, i.e., for example, at the level of the ball, a magnetic discontinuity is created in the valve housing. When current flows through the magnetic coil, a magnetic field acts on the closing body at the level of the magnetic discontinuity, as a result of which the closing body is lifted from the valve seat. When the current is turned off, the flow of medium passing through the valve carries the closing body back to the valve seat.

Valves of this type are characterized by very short switching times. These valves are preferably configured in such a way that switching times of as short as one millisecond are achieved. This makes it possible to meter the blowing air conducted through the valve in an especially effective manner.

In particular, it can be provided that the closing body of the flow-control valve is moved back and forth at an adjustable frequency between an open position and a closed position. The volumetric flow rate through the valve can be adjusted through the choice of frequency. In particular, it can be provided that the valve is actuated by a pulse-width-modulated signal. The flow-control valve preferably controls the volumetric flow rate of the blowing gas introduced into the preform during the preblowing phase.

According to the invention, a control device for controlling a blow-molding machine for the production of a container of thermoplastic material is provided in which a blowing gas for the blow-molding of the container is introduced into a thermally conditioned preform, while the preform is being held in a blow mold of the blow-molding machine. The control device comprises a control unit, which is set up to generate a control signal for setting a flow-control valve, which determines the volumetric flow rate of the blowing gas. In particular, it is possible for the control signal to be used to set the volumetric flow rate during the preblowing phase.

In a preferred embodiment, the control unit is set up to generate the control signal as a function of a position signal representing the control position of a flow-control valve.

In another embodiment, it can be provided that, in the control unit, a nominal profile is stored, which describes the change over time in the volumetric flow rate of the blowing gas, and that the control unit is set up to generate the control signal for setting the flow-control valve as a function of the nominal profile.

A desired upper and/or lower limit value of the volumetric flow rate of the blowing gas is preferably stored in the control unit for at least one point in time of the blow-molding process, and the control unit is set up to compare a volumetric flow rate signal containing information on the flow quantity of the blowing gas introduced into the preform with the limit values and to determine the difference between the volumetric flow rate signal and the limit values.

According to the invention, a blow-molding machine for the production of a container of thermoplastic material is also provided, in which a blowing gas for the blow-molding of the container is introduced into a thermally conditioned preform, while the preform is being held in a blow mold of the blow-molding machine, wherein the blow-molding machine is set up to implement a method according to the invention and/or the blow-molding machine comprises a control device according to the invention.

In particular, it is possible for the blow-molding machine to comprise at least one of the fluid-mechanical components cited in conjunction with the embodiments of the method. This pertains in particular to the electrically actuated flow-control valve, the flow-control valve position sensor, and the volumetric flow rate sensor.

It has been found especially advantageous to the invention to use, as the flow-control valve, a valve with a closing body which can be moved, especially moved magnetically, between an open position and a closed position. It is preferably provided that the closing body is moved back and forth between the open and closed positions at an adjustable frequency.

In one embodiment, it is provided that the flow-control valve is an RRV (Rapid Reaction Valve). In contrast to the volumetric flow rate control by the setting of the cross section of the flow-control valve, the volumetric flow rate in the case of valves with a closing body which can be moved between an open and a closed position is determined by the ratio between the closed and open times.

The superior features of the blow-molding machine according to the invention and of the control device according to the invention can also be derived from the advantages cited with respect to the method according to the invention.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
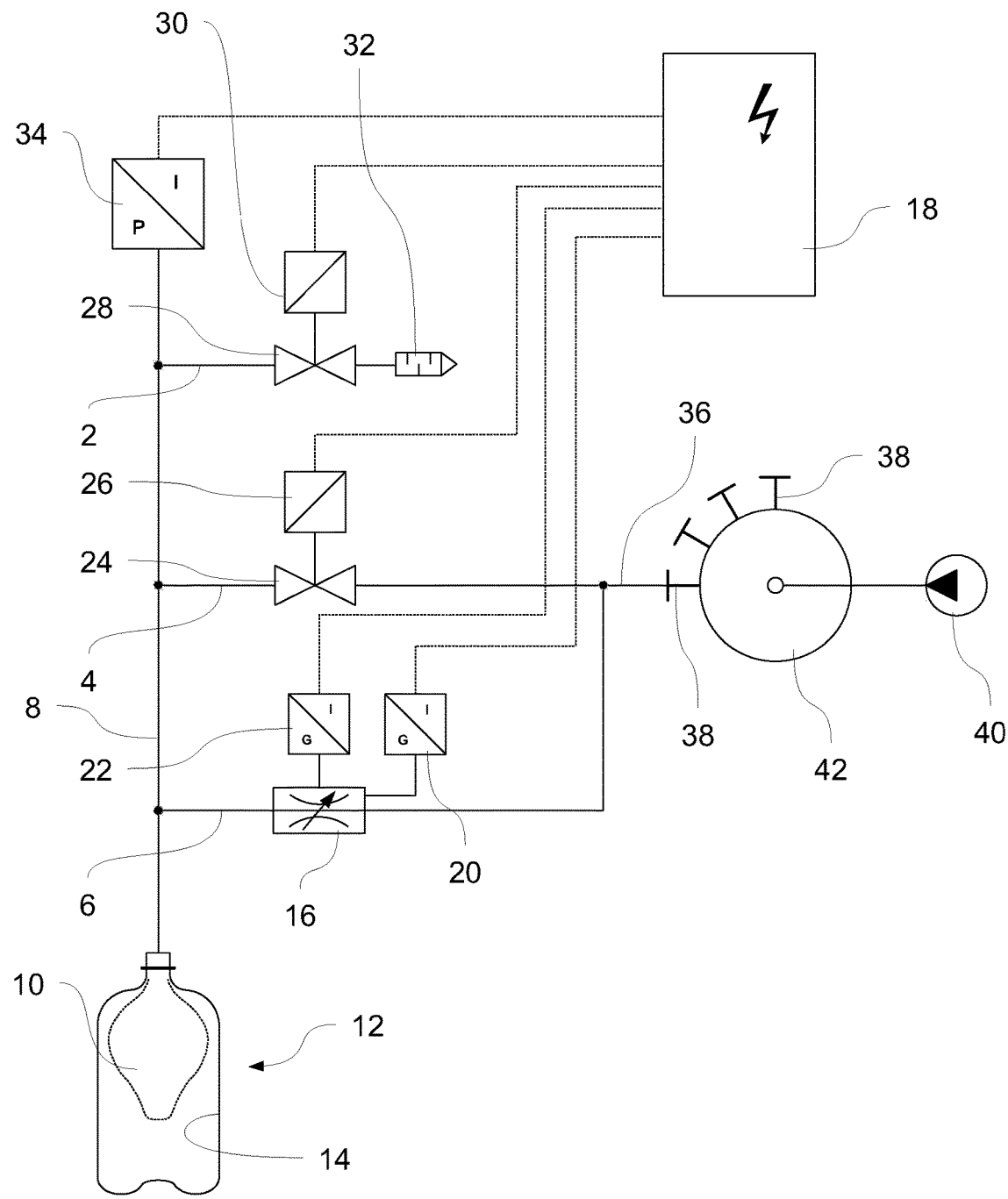
FIG. 1 shows a schematic diagram of the fluid-mechanical configuration of a blowing gas feed with continuously variable control of a flow-control valve.

FIG. 1 shows a schematic diagram of the fluid-mechanical configuration of the blowing-air feed of a blow-molding machine to a blow mold 12. Inside the blow mold 12, a preform 10 is arranged, which can be subjected to blowing air through a feed line 8. The blowing air is conducted from a blowing-air supply 40 to a blowing-air distributor 42, which distributes the blowing air via the connecting ports 38 and supply lines 36 connected to them to the blowing stations, each of which has a blow mold 12. In the embodiment of the blow-molding machine as a rotary table device, the blowing-air distributor 42 can be rotary distributor.

So that the blowing air can be conducted into the preform 10, the blow mold communicates with the blowing-air feed line 8. The blowing-air feed line 8 in the present exemplary embodiment is connected to the gas lines 2, 4, and 6. The blowing-air feed line 8 can be vented via the gas line 2. The valve 28 is opened to vent it. For this purpose, the control system transmits a signal to the signal converter 30, which is connected mechanically or electrically to the valve 28. When the valve 28 is open, pressure can pass from the blowing-air feed line 8 to the sound damper 32 and be discharged from there to the environment.

The valves 24 and 52 are controlled analogously to the actuation of the valve 28. Alternatively, the valves 24, 28, and 52 can be actuated by control air (not shown). The signal converters 26, 30, and 54 assigned to the valves 24, 28, and 52 can be provided as status sensors, which transmit the open position or the closed position of the valves to the control system 18.

The gas line 4 is controlled by the shutoff valve 24. The shutoff valve 24 is connected to the signal converter 26. Via the gas line 4, blowing air can be conducted to the preform 10 inside the blow mold 12, this air serving in particular for the finish-blowing of the container to be molded. In particular, the finish-blowing step takes place abruptly and at high pressure, which is applied quickly. In particular, a blowing gas pressure of 40 bars can be provided for the finish-blowing. For the abrupt introduction of the finish-blowing air into the preform 10, the shutoff valve 24 can have an open cross section of approximately 300 mm$^2$. The shutoff valve 24 is preferably connected on the inlet side directly, that is, without pressure reducers, flow-control valves, or the like, to the distributor 42. Thus a blowing pressure provided by the distributor 42 is conducted directly via the valve 24 to the blow mold 12.

The gas line 6 serves to introduce blowing air into the preform 10 during the preblowing phase. In the preblowing phase, the blowing air is introduced into the preform 10 in such a way that the material of the preform expands toward the inside walls 14 of the blow mold 12 in a controlled manner. To set the volumetric flow rate of the blowing air during the preblowing phase, the flow-control valve 16, configured as a cross-sectional control valve, is used according to the invention. The flow-control valve 16 is connected to the control system 18 by way of a signal converter 22. The signal converter 22 receives signals from the control system 18 for the setting of the flow-control valve 16. It is preferable for the flow-control valve 16 to communicate directly with a control position sensor 20, wherein the control position sensor 20 detects the position of the flow-control valve 16 and transmits it to the control system 18. The signals of the control position sensor 20 can be used to determine whether or not the flow-control valve 16 is functioning properly. The flow-control valve 16 preferably communicates directly on the inlet side with the distributor 42. In particular, it is provided that no pressure-reducing components such as pressure reducers or the like are arranged in the connection between the distributor 42 and the flow-control valve 16.

FIG. 1 shows how preblowing is carried out during the preblowing phase with continuously variable flow control or continuously variable automatic flow control. It is clear on comparison with the prior art in FIG. 4 that there is no automatic pressure control valve 48 in the preblowing circuit. Through the use of the method according to the invention, there is no need to reduce the primary blowing pressure to 10 bars, for example. The preblowing pressure is tapped directly from the finish-blowing pressure, i.e., from the distributor 42. The distributor 42 obtains the blowing gas from the gas source 40.

In the exemplary embodiment of FIG. 1, the flow-control valve 16 is configured as an electromechanical actuator, which is controlled by the control system 18. The flow-control valve 16 transmits information via the control position sensor 20 to the control system 18, in which the flow-control valve setting is mapped. This can be helpful, for example, when the control system 18 specifies a certain control valve value but the flow-control valve 16 itself does not reach the desired set value. In this case, the control valve position sensor 20 reports to the control system 18 that the control position deviates from the desired value, and the control system 18 can then generate an error message. Independently of the concrete exemplary embodiment shown here, the control system 18 can therefore be set up to generate an error message for displaying a defective flow-control valve 16 and/or to send it elsewhere for display.

In principle, a flow-control valve position sensor 20 is not absolutely necessary. It is provided that, once a setting profile for the flow-control valve 16 has been stored in the control system 18, the preblowing step will follow the same profile each time. A checkback signal from the sensor 20, however, is helpful with the error analysis when, for example, finished blow-molded containers from a certain blow-molding station have defects produced during preblowing. The flow-control valve 16 of this blow-molding station can be singled out for inspection. This decreases the down times of the blow-molding machine.

After the preblowing step, the finish-blowing of the container is carried out. For this purpose, blowing air is conducted from the distributor 42, through the valve 24 to the gas line 4, and finally to the blowing-air feed line 8 and thus to the blow mold 12. During the finish-blowing step, the important point is that, by means of an abrupt increase in pressure, the material of the preform, which has been brought up to the walls of the blow mold, is pressed suddenly, i.e., very quickly and at high pressure, even more closely against the walls of the blow mold. This ensures that the contours of the bottle will be well formed and that the finished bottle will cool rapidly. In principle, it is conceivable that the valve 24 and the associated finish-blowing circuit could be omitted in cases where the flow-control valve 16 can be opened abruptly and can thus supply the finish-blowing air abruptly into the preform. For this purpose, it would be necessary for the flow-control valve 16 to be opened to an open cross section of approximately 300 mm$^2$; the flow-control valve 16 would also have to have a rapid reaction time.

A pressure measurement transducer is shown at 34; it detects the gas pressure in the blowing-air feed line 8 and provides information describing the gas pressure for transmission to the control system 18. The gas pressure of the blowing gas introduced into the preform can thus be monitored by the control system 18 and subjected to further processing for control purposes. For example, on the basis of the blowing gas pressure, the control of the valves 16, 24 and/or 28 can be coordinated.

Figure 2:
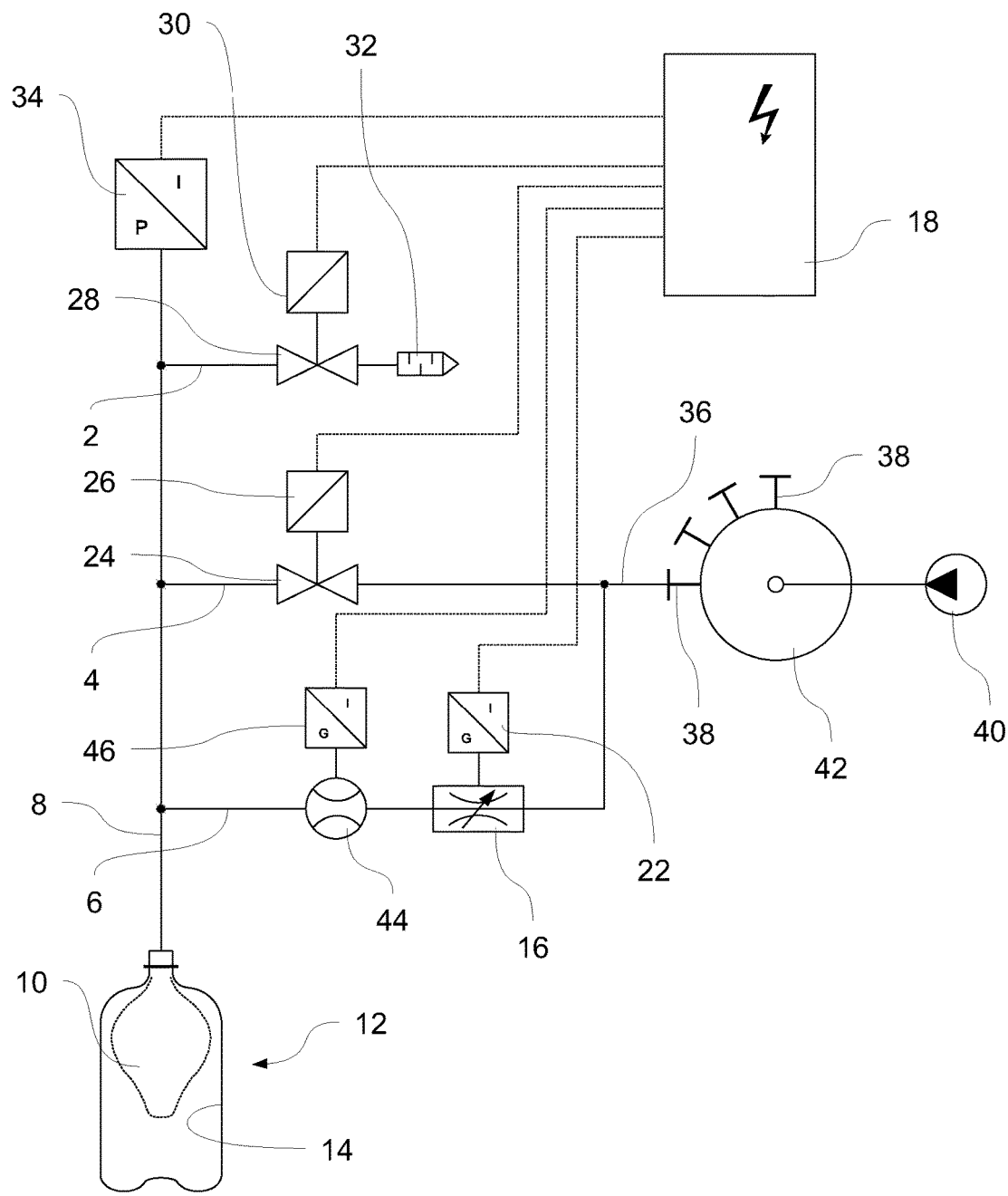
FIG. 2 shows a schematic diagram of the fluid-mechanical configuration of a blowing-gas feed with continuously variable control of the volumetric flow rate.

FIG. 2 shows a schematic diagram of the fluid-mechanical configuration of the blowing-air feed of a blowing air supply 40 via a blowing air distributor 42 to the blow mold 12 according to another embodiment. In contrast to FIG. 1, a volumetric flow rate sensor 44 is provided in the preblowing circuit, that is, in the area of the gas line 6 between the blowing-air feed line 8 and the distributor 42. The volumetric flow rate sensor is in particular arranged downstream from the flow-control valve 16. The flow-control valve position sensor 20 in FIG. 1 is also missing here.

The volumetric flow rate sensor 44 measures the volumetric flow rate of the blowing air through the gas line 6 and transmits this information via a signal converter 46 to the control system 18. The information provided by the volumetric flow rate sensor 44 is used for a control or automatic control algorithm, which is processed by the control system 18. The volumetric flow rate through the gas line 6 can be provided as a control variable. The volumetric flow rate sensor 44 can also be arranged upstream of the flow-control valve 16.

The detailed change over time in the blowing air volume introduced into the preform can be derived from an evaluation of the information provided by the volumetric flow rate sensor 44. This offers the advantage, for example, that, as a result, direct conclusions can be drawn concerning the expansion behavior of the preform 10 during the preblowing phase. It is conceivable, for example, that, as the profile stored in the control system 18 for controlling the flow-control valve 16 is being implemented, differences may occur in the shaping of the preforms 10. This can be attributable to the fact that, for example, the material of the preforms comprises deformations or other irregularities. Through the knowledge of the volumetric flow rate during the preblowing step, upper and/or lower limit values can be determined, between which the blowing air volume introduced into the preform 10 during the preblowing step must remain. Thus the production of defective containers can be prevented. When a volumetric flow rate sensor 44 is used, it is possible to draw conclusions as to whether or not the volume of blowing air during the preblowing step is within this corridor formed by the limit values. Alternatively, the volumetric flow rate conducted through the flow-control valve 16 can be calculated by the control system 18 if the pressure difference between the inlet and the outlet of the flow-control valve 16 and the flow-control valve position are known.

In principle, it is not provided that the measurement variable of the volumetric flow rate sensor 44 exerts a direct influence on the setting of the flow-control valve 16. The direct influence, however, can be provided if the control system 18, on the basis of the measurement values of the volumetric flow rate sensor 44, recognizes that the blowing air volume introduced into the preform 10 overshoots or undershoots the defined corridor limits. In addition, a direct connection of the measurement value of the volumetric flow rate sensor 44 to the setting of the flow-control valve 16 can be provided by way of a closed-loop control circuit.

The use of a volumetric flow rate sensor 44 also offers the advantage that aging phenomena or functional incapacities of a flow-control valve 16 or of a blow-molding station can be detected.

Figure 3:
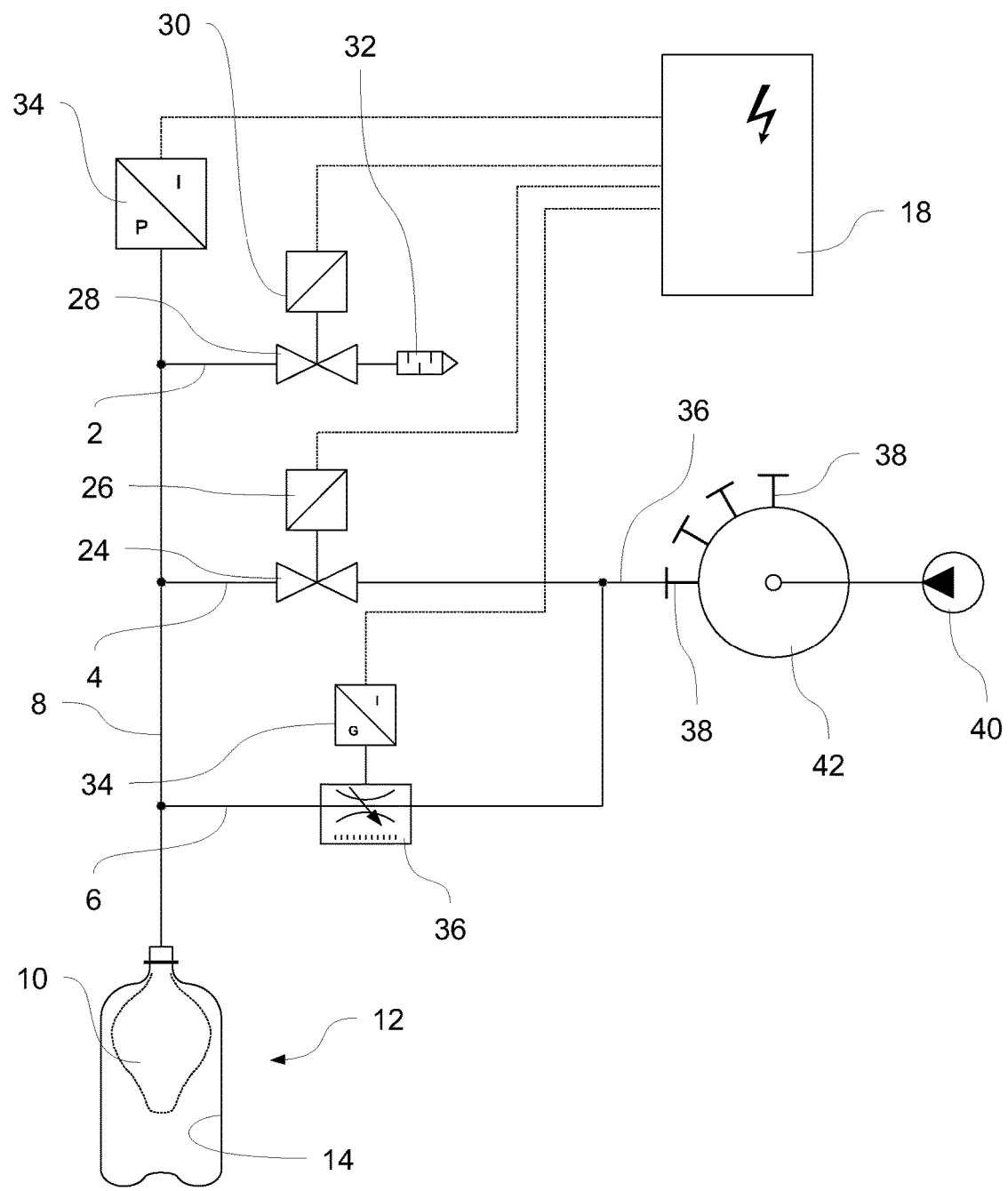
FIG. 3 shows a schematic diagram of the fluid-mechanical configuration of a blowing gas feed with stepwise control of a flow-control valve.

FIG. 3 shows a schematic diagram of the blowing-air feed of a blow-molding machine to the blow mold 12, in which a stepwise-adjustable flow-control valve 36 is arranged in the preblowing circuit, i.e., in the area of the gas line 6 between the distributor 42 and the blowing-air feed line 8. In contrast to the exemplary embodiments of FIGS. 1 and 2, in the present case the blowing-air feed to the preform 10 inside the blow mold 12 is adjusted in a stepwise manner during the preblowing step. This can be advantageous when a continuously variable and thus finely adjustable setting of a flow-control valve is not necessary for the preblowing process. In principle, a flow-control valve 36 which can move only in a stepwise manner is of simpler design than a continuously variable flow-control valve 16 as present in FIGS. 1 and 2. The flow-control valve 36 is less expensive and mechanically less complex. It is readily conceivable that the stepwise-adjustable flow-control valve 36 could also be combined with a flow-control valve position sensor 20 of FIG. 1 and/or with a volumetric flow rate sensor 44 of FIG. 2.

Figure 4:
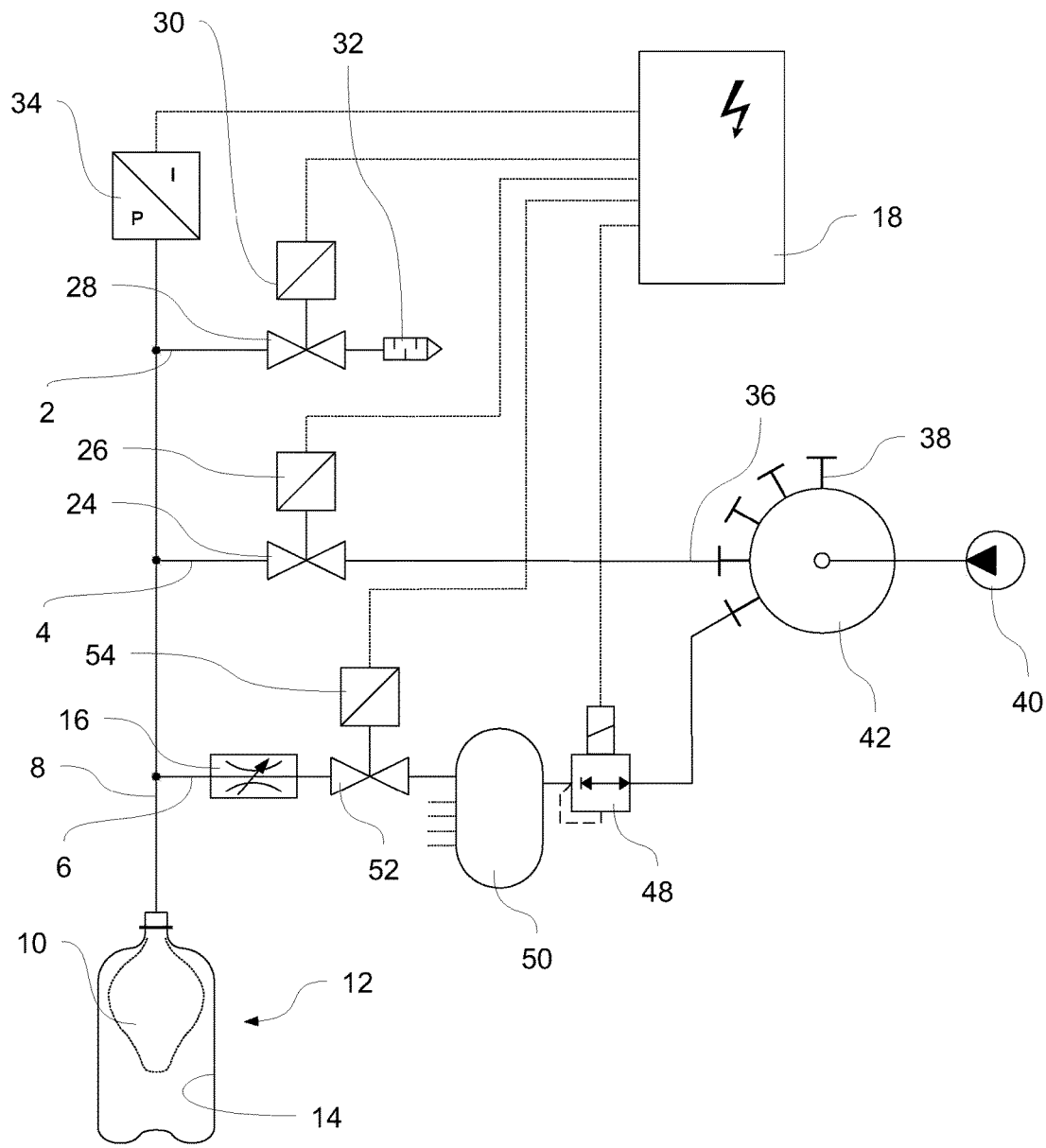
FIG. 4 shows a schematic diagram of the fluid-mechanical configuration of a blowing-gas feed with a blowing-air control system known from the prior art in the preblowing phase.

FIG. 4 shows a purely schematic diagram of the fluid-mechanical configuration of a blowing-air feed from a blowing air supply 40 via a distributor 42 to a blow mold 12 of a blow-molding station known from the prior art. In contrast to the exemplary embodiments of FIGS. 1-3 according to the invention, a manually adjustable flow-control valve 56 for controlling the volumetric flow rate of the preblowing air is provided in the preblowing circuit in the area of the gas line 6 between the distributor 42 and the blowing-air feed line 8. Upstream from the flow-control valve 56, a blowing air valve 52 controlling the gas line 6 is arranged, which can be actuated by the control system 18 by way of the signal converter 54. Further upstream from the valve 52, a tank 50 is connected to the gas line 6; this tank is configured as an intermediate gas reservoir and makes it possible to distribute the blowing air to additional blowing stations of the blow-molding machine. Further upstream from the tank 50, a pressure control valve 48 is provided, which is subjected on the inlet side to the primary blowing pressure from the distributor 42. The pressure control valve 48 reduces the pressure of the blowing air from the distributor 42 to about 10 bars. On the outlet side, the pressure control valve communicates with the tank 50. As needed, the tank 50 distributes the blowing air to several blow-molding stations of a blow-molding machine.

The disadvantage of the way in which the blowing air is supplied according to FIG. 4 is associated with the use of an expensive and maintenance-intensive pressure controller 48 and of a tank 50, which is responsible for distributing the preblowing air to the individual blow-molding stations. The preblowing circuit thus becomes complex and fault-prone. In addition, the pressure of the preblowing air can only be set centrally at the pressure control valve 48 jointly for all of the blow-molding stations of the blow-molding machine.

While specific embodiments of the invention have been shown and described in detail to illustrate the inventive principles, it will be understood that the invention may be embodied otherwise without departing from such principles.

We claim:

1. A method for controlling a blow-molding machine for producing a container of thermoplastic material, the method comprising the steps of:
    introducing a blowing gas for blow-molding the container into a thermally conditioned preform, while the preform is held in a blow mold of the blow-molding machine, including introducing the blowing gas during a preblowing phase into the preform so that the thermally-conditioned material of preform approaches walls of the blow mold; introducing the blowing gas during a following finish-blowing phase into the preform so that the thermally-conditioned material of the preform is pressed into contours of the walls of the blow mold; controlling a volumetric flow rate of the blowing gas at least during the preblowing phase by an adjustable flow-control valve, the flow control valve being controllable by a control unit that generates a control signal for setting the flow-control valve; and adjusting the flow-control valve as a function of the control signal, wherein the flow-control valve has a closing body that is movable between an open position and a closed position, wherein the controlling of the volumetric flow rate includes moving the closing body of the flow-control valve back and forth between the open and closed positions at an adjustable frequency to adjust the volumetric flow.

2. A method according to claim 1, wherein an electrically actuated flow-control valve is used as the flow-control valve.

3. A method according to claim 1, wherein the flow-control valve is a continuously variable flow-control valve or a stepwise-adjustable flow-control valve.

4. A method according to claim 1, including subjecting the flow-control valve on an inlet side to gas pressure of the blowing gas of the finish-blowing phase.

5. A method for controlling a blow-molding machine for producing a container of thermoplastic material, the method comprising the steps of:
introducing a blowing gas for blow-molding the container into a thermally conditioned preform, while the preform is held in a blow mold of the blow-molding machine, including introducing the blowing gas during a preblowing phase into the preform so that the thermally-conditioned material of preform approaches walls of the blow mold; introducing the blowing gas during a following finish-blowing phase into the preform so that the thermally-conditioned material of the preform is pressed into contours of the walls of the blow mold; controlling a volumetric flow rate of the blowing gas at least during the preblowing phase by an adjustable flow-control valve, the flow control valve being controllable by a control unit that generates a control signal for setting the flow-control valve; and adjusting the flow-control valve as a function of the control signal, wherein a flow-control valve position sensor detects the setting of the flow-control valve and generates a position signal, which contains information on a position of the flow-control valve, and the position signal is transmitted to the control unit wherein the control unit generates the control signal for setting the flow-control valve as a function of the position signal.

6. A method according to claim 1, wherein a flow-control valve has an open cross section adjustable in a range from 0.8 mm² to and including 20 mm².

7. A method for controlling a blow-molding machine for producing a container of thermoplastic material, the method comprising the steps of:
introducing a blowing gas for blow-molding the container into a thermally conditioned preform, while the preform is held in a blow mold of the blow molding machine, including introducing the blowing gas during a preblowing phase into the preform so that the thermally-conditioned material of preform approaches walls of the blow mold; introducing the blowing gas during a following finish-blowing phase into the preform so that the thermally-conditioned material of the preform is pressed into contours of the walls of the blow mold; controlling a volumetric flow rate of the blowing gas at least during the preblowing phase by an adjustable flow-control valve, the flow control valve being controllable by a control unit that generates a control signal for setting the flow-control valve; and adjusting the flow-control valve as a function of the control signal, including storing a nominal profile in the control unit which nominal profile describes a change over time in the volumetric flow rate of the blowing gas; the control unit generating the control signal for setting the flow-control valve as a function of the nominal profile.

8. A method according to claim 1, wherein a volumetric flow rate sensor communicating with the flow-control valve generates a volumetric flow rate signal containing information on flow quantity of the blowing gas, wherein the volumetric flow rate signal is transmitted to the control unit.

9. A method according to claim 8, wherein, in the control unit, a desired upper and/or lower limit value for the volumetric flow rate of the blowing gas is stored for at least one point in time of the preblowing phase, wherein the control unit compares the volumetric flow rate signal with the limit values and generates the control signal as a function of a difference between the volumetric flow rate signal and at least one of the limit values.

10. A method according to claim 1, wherein the closing body is magnetically movable.

* * * * *